Oct. 21, 1924.
C. W. SAALBURG
ANIMATED PICTURE
Filed June 5, 1923
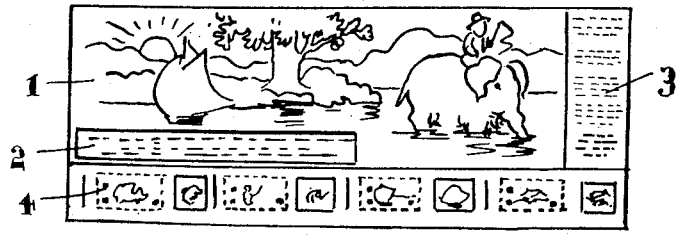
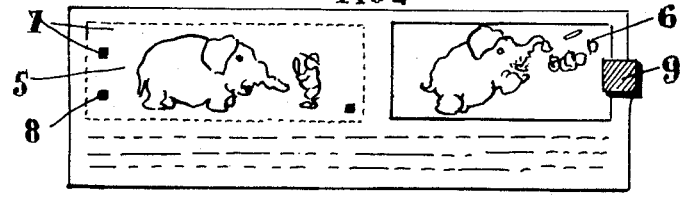
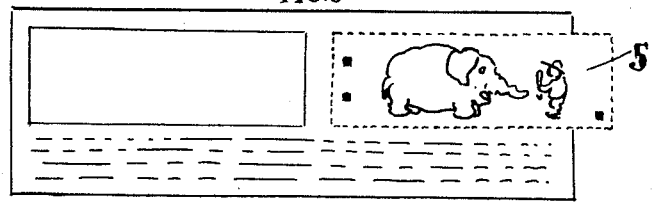
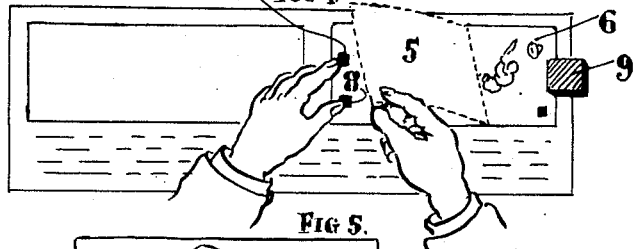
Charles W. Saalburg,
INVENTOR
BY
Robert B. Killgore
ATTORNEY Patented Oct. 21, 1924.

1,512,138

UNITED STATES PATENT OFFICE.

CHARLES W. SAALBURG, OF NEW YORK, N. Y.

ANIMATED PICTURE.

Application filed June 5, 1923. Serial No. 643,510.

*To all whom it may concern:*

Be it known that I, CHARLES W. SAALBURG, a citizen of the United States, residing at New York city, in the county of Bronx and State of New York, have invented certain new and useful Improvements in Animated Pictures, of which the following is a specification.

My invention relates to animated or moving pictures to be printed in newspapers, periodicals or books and it is my object to so draw or arrange the pictures that they may be cut out and laid one over the other in such a way that on flipping the upper picture rapidly to and from the lower one the illusion of movement in the picture is produced. A further object is to so associate the animated pictures with a main picture and story that an impression of movement in one or more of the characters in the main picture will be produced and some of the actions recited in the story will be performed.

In the drawing Fig. 1 is a view of the complete picture; Fig. 2 a view of the two elements making up the animated picture apart from the main picture; Fig. 3 a view of the picture of Fig. 2 with one picture cut out and laid on the other; Fig. 4 a view showing how the upper picture is flipped to produce the illusion of animation; and Fig. 5 a view of the method of using the two pictures to produce the desired illusion.

In Fig. 1, showing a complete layout, the main picture 1 is shown in the upper, left hand portion, with the reading matter telling the story at 2 and 3 adjacent thereto.

A set of pairs of pictures 4, depicting episodes in the main picture 1, is made along the lower part of the sheet.

In Fig. 2 I have shown a pair of these pictures apart from the sheet. This consists of the picture 5 in which the boy and the elephant characters of the main picture are shown in one attitude and the picture 6 in which they are shown in a different attitude.

The picture 5 is provided with indicator marks 7 and 8 adjacent the left hand edge and is cut out and laid on the picture 6 in register therewith, a coin or other weight 9 being laid on the right hand edge of the sheet to hold the picture 6 down. The picture 5 is held in position by the thumb and forefinger of the left hand bearing on the indicator marks 7 and 8 and on rapidly flipping the picture 5 back and forth to cover and uncover the lower picture the illusion of an animated or moving picture of the elephant throwing the boy is produced.

In practice the upper picture 5 is made longer than the lower picture 6 so that the right hand will not obscure the view of the pictures when they are flipped.

To produce the illusion of animation it is essential that the observer look straight down on the pictures as shown in Fig. 5.

The pictures may be printed in black and white or in colors in any desired manner and may be used as newspaper or periodical illustrations to be cut out and operated or they may be made in book form in which latter case the upper and lower pictures may be permanently bound together in the book.

I claim:—

1. As a new article of manufacture, a main picture depicting a story and associated therewith an animated picture composed of two pictures adapted to be laid one over the other, each picture representing different attitudes of figures in the main picture, the upper one being adapted to be flipped back and forth to cover and uncover the lower one to produce the illusion of motion in the figures.

2. As a new article of manufacture, a main picture, depicting a story and associated therewith an animated picture composed of two pictures adapted to be laid one over the other, each picture representing different attitudes of figures in the main picture, the upper one being adapted to be flipped back and forth to cover and uncover the lower one to produce the illusion of motion in the figures, the whole series of pictures associated with a textual story of the same.

In testimony whereof I have affixed my signature.

CHARLES W. SAALBURG.